United States Patent [19]

Miyake et al.

[11] Patent Number: 5,002,148

[45] Date of Patent: Mar. 26, 1991

[54] TRACTION CONTROL METHOD AND APPARATUS FOR MOTOR VEHICLES

[75] Inventors: Katsuya Miyake, Ageo; Kinji Ogino, Kuki; Shigeki Moride; Hideo Akima, both of Yokohama, all of Japan

[73] Assignees: Akebono Brake Industry Co., Ltd., Tokyo; Akebono Research and Development Centre Ltd., Hanyu; Fujitsu Limited, Kawasaki, all of Japan

[21] Appl. No.: 300,411

[22] Filed: Jan. 23, 1989

[30] Foreign Application Priority Data

Jan. 22, 1988 [JP] Japan .................. 63-10834

[51] Int. Cl.⁵ .............................................. B60T 8/32
[52] U.S. Cl. .................... 180/197; 303/103; 364/426.03
[58] Field of Search .................. 180/197, 244, 6.2; 303/103, 106; 364/426.03

[56] References Cited

U.S. PATENT DOCUMENTS

| | | | |
|---|---|---|---|
| 4,583,611 | 4/1986 | Frank et al. | 364/426.03 X |
| 4,625,824 | 12/1986 | Leiber | 180/197 |
| 4,685,547 | 8/1987 | Ohashi et al. | 180/197 X |
| 4,718,735 | 1/1988 | Ogino | 303/103 X |
| 4,733,760 | 3/1988 | Inagaki et al. | 180/197 X |
| 4,739,856 | 4/1988 | Inagaki et al. | 180/197 |
| 4,760,893 | 8/1988 | Sigl et al. | 364/426.03 X |

Primary Examiner—Charles A. Marmor
Assistant Examiner—Brian L. Johnson

[57] ABSTRACT

A traction control method/apparatus for motor vehicles is arranged such that at an initial stage of the starting or accelerating operation of the motor vehicle where a large amount of slip of the driving wheel tends to be caused, a braking force is sufficiently applied to the driving wheel to restrain the slip thereof; and after the engine output is adjusted through accelerator or throttle control which is performed simultaneously with the application of the braking force, the procedure for controlling the brake hydraulic pressure is changed to eliminate the difference between the lefthand and righthand driving wheel speeds.

8 Claims, 7 Drawing Sheets

TRACTION CONTROL METHOD AND APPARATUS FOR MOTOR VEHICLES

BACKGROUND OF THE INVENTION

1. Field of the Invention

The present invention relates to a traction control method for motor vehicles and an apparatus for working such a method, and more particularly it pertains to such method and apparatus wherein a slip of driving wheel which tends to be caused when the motor vehicle starts or accelerates, is detected to control the output of the motor vehicle engine and braking of the driving wheel, thereby restraining the slip of the driving wheel.

2. Description of the Prior Art

Known in the art is a traction control system for motor vehicles, which is arranged, when the motor vehicle runs on a low-friction road surface such as a frozen, snow-covered or muddy one, to restrain a slip of driving wheel which tends to be caused in an attempt to start or accelerate the motor vehicle, thereby enhancing the starting/accelerating performance as well as the running stability of the vehicle. With such a conventional traction control system, it has been the usual practice that a slip of each of the lefthand and righthand driving wheels is detected; and when the extent of the slip exceeds a predetermined value, a brake hydraulic pressure applied to a brake device for each driving wheel is increased so that the braking of the driving wheels is controlled, while at the same time the engine output is also controlled, as disclosed in Japanese Patent Publication (Laid-Open) No. 61-85248.

However, such a conventional traction control system is disadvantageous in that when it is attempted to control the brake hydraulic pressure applied to the brake device for each of the left hand and righthand driving wheels, there is a tendency that the difference between the lefthand and righthand driving wheel speeds is increased so that a hunting phenomenon is caused to occur; and in addition, difficulty is encountered in securing a match between the brake hydraulic pressure control and the engine output control due to the difference in response speed therebetween so that an uncomfortable feeling is given to the driver and a vibration is imparted to the vehicle body.

SUMMARY OF THE INVENTION

Accordingly, it is an object of the present invention to provide a traction control method for motor vehicles, which is adapted to smoothly and efficiently restrain a slip of a driving wheel which tends to occur when the motor vehicle starts or accelerates. Another object is to provide an apparatus for working such a method.

According to the present invention, at an initial stage of the starting or accelerating operation of the motor vehicle where a large amount of slip of the driving wheel tends to be caused, a braking force is sufficiently applied to the driving wheel to restrain the slip thereof; and after the engine output is adjusted through accelerator or throttle control which is performed simultaneously with the application of the braking force, the procedure for controlling the brake hydraulic pressure is changed to eliminate the difference between the lefthand and righhand driving wheel speeds.

To this end, in the traction control method of the present invention, a lower one of the the lefthand and righthand driving wheel speeds is selected as a control object speed which is compared with a threshold value preset in relation to vehicle speed to control the engine speed; a time period during which the braking of the driving wheels is controlled, is divided into an initial or first control period and a subsequent second control period; during the first control period, each of the driving wheel speeds is compared with the threshold value to control the braking of the respective driving wheel; and during the second control period, each of the driving wheel speeds is compared with a speed which is higher by a predetermined amount than the above-mentioned control object speed to perform the braking control.

The traction control apparatus for motor vehicles according to an embodiment of the present invention comprises wheel speed detecting means for detecting the lefthand and righthand driving wheel speeds; select-low means for selecting lower one of the driving wheel speeds as a control object speed; reference speed setting-up means for setting up, as a reference speed, a speed which is higher by a predetermined amount than the control object speed; threshold value setting-up means for setting up a threshold value in relation to vehicle speed; engine output control means for controlling engine output by comparing the control object speed with the above-mentioned threshold value; and brake hydraulic pressure control means wherein a control period during which the braking of the driving wheels is controlled, is divided into an initial or first control period and a subsequent control period; during the first control period, each of the driving wheel speeds is compared with said threshold value to perform the braking control of the respective driving wheels; and during the second control period, each of the driving wheel speeds is compared with the above-mentioned reference speed to perform the braking control of the respective driving wheels.

As will be appreciated from the above discussion, according to the present invention, the lower one of the lefthand and righthand driving wheel speeds is selected as the control object speed; the engine output control is effected by comparing the threshold value preset in relation to the vehicle speed with the control object speed, thereby restraining a slip of the driving wheels, while at the same time permitting a sufficient torque to be transmitted to the driving wheels. Further, the control period during which the brake hydraulic pressure is controlled, is divided into the first control period and the subsequent second control period; during the first control period that the slip of the driving wheels predominantly occurs, the brake hydraulic pressure is controlled by comparing the respective driving wheel speeds with said threshold value so that a sufficient braking force can be applied to the respective driving wheels, which, coupled with the engine output control which is performed at the same time, works to most effectively restrain the slip of the driving wheels. The engine output is adjusted to be suitable for the friction coefficient $\mu$ of a road surface in the first control period, and thus in the second control period after the first control period has elapsed, the brake hydraulic pressure is controlled by comparing the respective driving wheel speeds with the reference speed based on the control object speed, thereby eliminating the difference between the lefthand and righthand driving wheel speeds so that a hunting phenomenon which would otherwise tend to be caused, can be prevented. The brake hydraulic pressures for the lefthand and righthand driving wheels is controlled independently so that the motor vehicle is enabled to start or accelerate smoothly and safely while the slip of the driving wheels can be restrained even when the motor vehicle runs on a so-called split-$\mu$ road surface, portions of which the lefthand and righthand driving wheels are placed on respectively, represent remarkably different friction coefficients.

DESCRIPTION OF THE PREFERRED EMBODIMENTS

The basic construction of the traction control apparatus according to the present invention will first be described with reference to FIG. 1.

Figure 1:
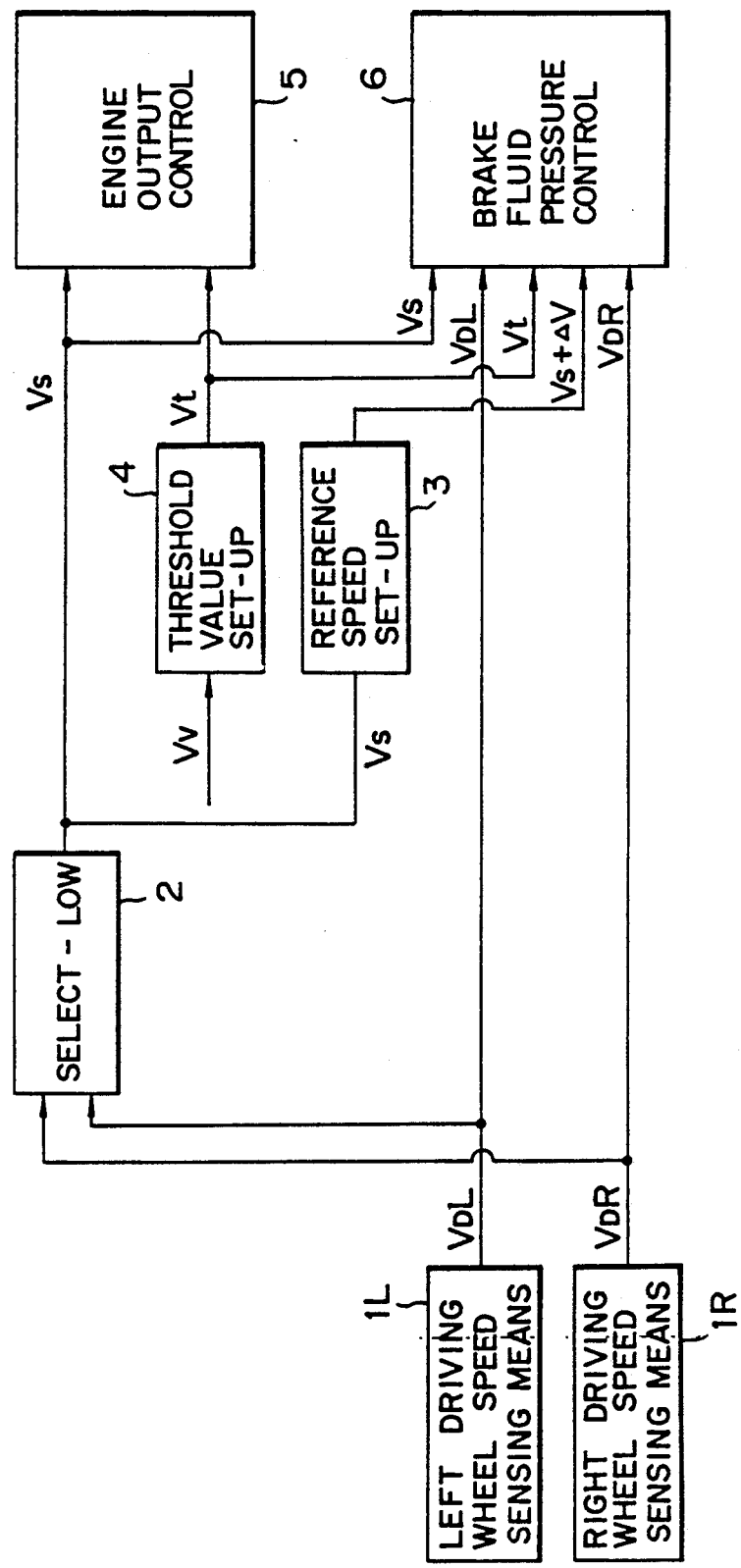
FIG. 1 is a block diagram showing the basic construction of the traction control apparatus for motor vehicles in accordance with the present invention.

In FIG. 1, lefthand and righthand driving wheel speeds VDL and VDR are detected by wheel speed detecting means 1L and 1R respectively. Lower one of the wheel speeds VDL and VDR is selected as control object speed Vs by a select-low means 2. Reference speed setting-up means 3 is provided for setting up, as a reference speed, a speed (Vs+$\Delta$V) which is higher by a predetermined value $\Delta$V than the control object speed Vs. There are also provided threshold value setting-up means 4 for setting up a threshold value Vt in relation to vehicle speed; engine output control means 5 for controlling an engine output by comparing the control object speed Vs with the threshold value Vt; and brake hydraulic control means 6 which is arranged such that a control period during which braking of the driving wheels is controlled, is divided into an initial or first control period and a subsequent second control period; during the first control period, each of the driving wheel speeds VDL and VDR is compared with the threshold value Vt to perform the braking control of the respective driving wheels; and during the second control period after the first control period has elapsed, the driving wheel speeds VDL and VDR are compared with the reference speed Vs+$\Delta$V to perform the braking control of the respective driving wheel speeds.

Figure 2:
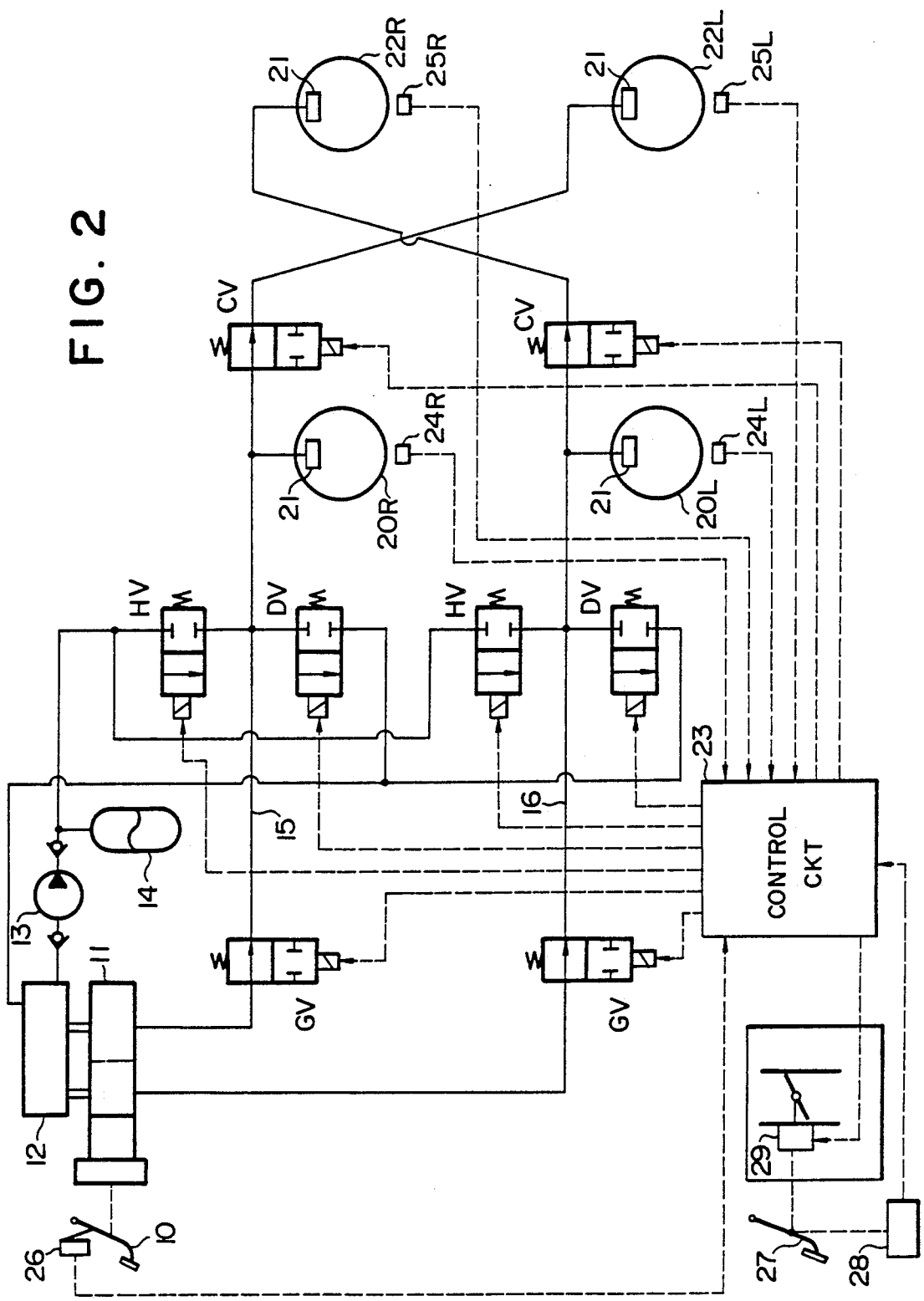
FIG. 2 is a diagram showing the apparatus according to an embodiment of the present invention.

Referring to FIG. 2, there is shown a systematic diagram of the traction control apparatus according to an embodiment of the present invention, wherein a master cylinder 11 including two pressure chambers (not shown) is actuated through a brake pedal 10 serving as a brake operating member; brake fluid is pumped up by means of a pump 13 from a reservoir 12 attached to an upper portion of the master cylinder 11 and stored in an accumulator 14 under a highly-pressurized condition.

One of the pressure chambers of the master cylinder 11 is connected to a wheel cylinder 21 of a brake device for braking a righthand front wheel 20R (driving wheel) through a fluid passage 15 which is provided with a gate valve GV and connected to a wheel cylinder 21 of a brake device for braking a lefthand rear wheel 22L (non-driving wheel) through a cut valve CV. The other pressure chamber of the master cylinder 11 is connected to a wheel cylinder of a brake device for braking a lefthand front wheel 20L (driving wheel) through a fluid passage 16 which is provided with a gate valve GV and connected to a wheel cylinder 21 of a brake device for braking a righthand rear wheel 22R (non-driving wheel) through a cut valve CV. Hold valves HV are connected between the liquid passage 15 and the accumulator 14, and between the fluid passage 16 and the accumulator 14. Decay valves DV are connected between the fluid passage 15 and the reservoir 12, and between the fluid passage 16 and the reservoir 12. The highly pressurized brake fluid accumulated in the accumulator 14 is supplied to or interrupted from the wheel cylinders through the opening/closing operation of the respective hold valves HV. The brake fluid contained in the wheel cylinders 21 is discharged to or interrupted from the reservoir 12 through the opening/closing operation of the decay valves DV.

The gate valves GV, cut valves CV, hold valves HV and decay valves DV may comprise solenoid valves and are also used to effect antilock control when the motor vehicle is braked, and the opening/closing operations of these valves are controlled in accordance with commands from a microcomputer-based control circuit 23. When the traction control is commenced with respect to the lefthand and righthand driving wheels 20L and 20R, the gate valves GV and cut valves CV are closed; the wheel cylinders 21 for the driving wheels 20L and 20R are separated from the master cylinder 11; and the wheel cylinders 21 for the non-driving wheels 22L and 22R are separated from the fluid passages 15 and 16. When the gate valves GV and cut valves CV are closed, the wheel cylinders for the non-driving wheels 22L and 22R are held in such a state that no brake fluid pressure is applied thereto. The brake fluid pressure in the wheel cylinders 21 for the driving wheels 20L and 20R are increased when the hold valves HV are opened and the decay valves DV are closed; it is held when the hold valves HV and decay valves DV are closed; and it is reduced when the hold valves HV are closed and the decay valves DV are opened.

Connected to the control circuit 23 are wheel speed sensors 24L, 24R, 25L and 25R for detecting the speeds of the wheels 20L, 20R, 22L and 22R; a brake switch 26 for detecting depression of brake pedal 10; and a sensor 28 for detecting the extent of depression of an accelerator pedal 27. The control circuit 23 controls the engine output by driving a throttle control mechanism 29 of the engine in response to information derived from these sensors, while at same time controlling the brake fluid pressure in the wheel cylinders 21 for the driving wheels 20L and 20R by causing the gate valves GV, cut valves CV, hold valves HV and decay valves DV to be opened and closed. When the brake switch 26 is operated, the traction control is ended immediately.

Figure 3:
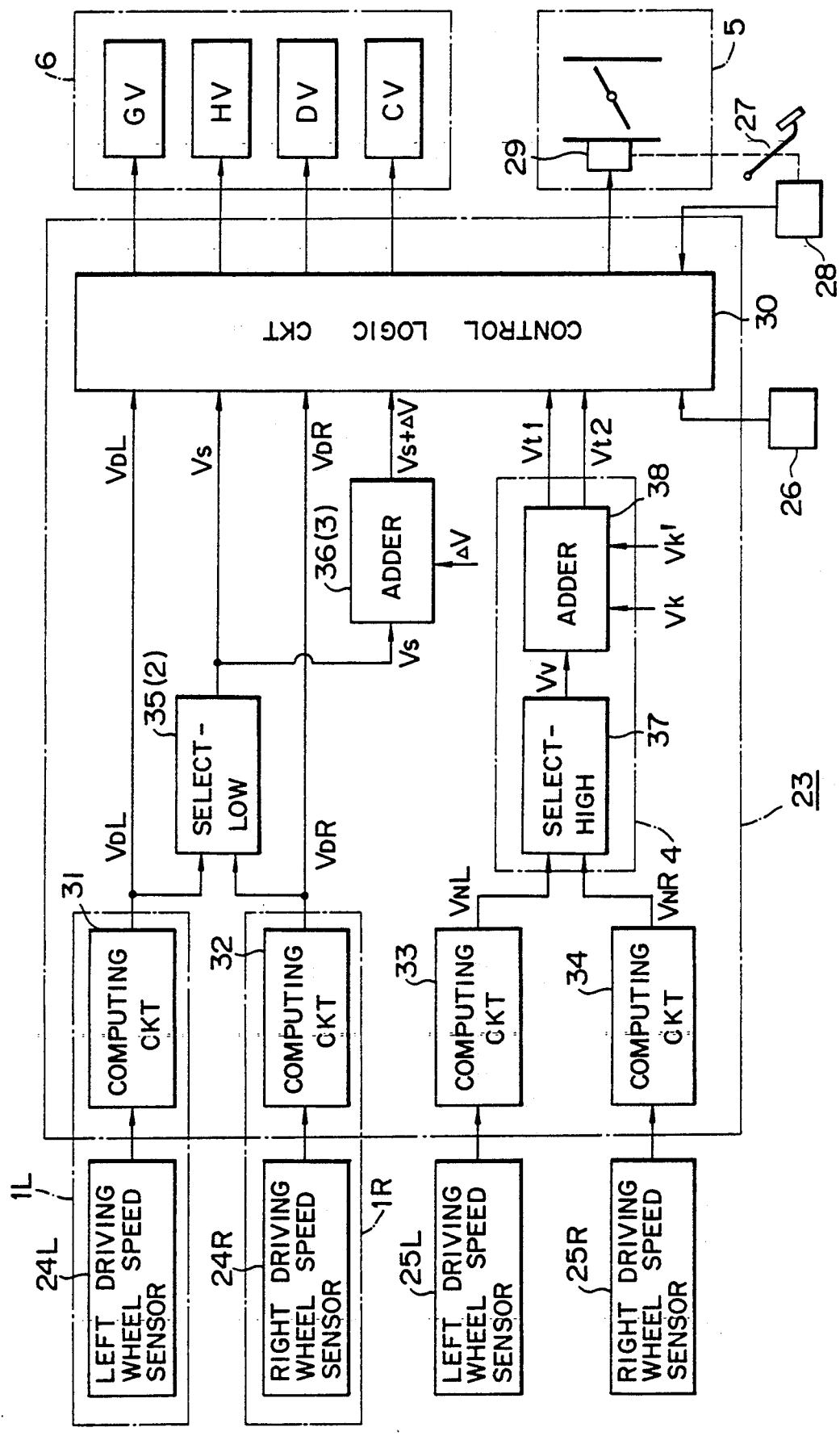
FIG. 3 is a block diagram showing the construction of the control circuit shown in FIG. 2.
Figure 4:
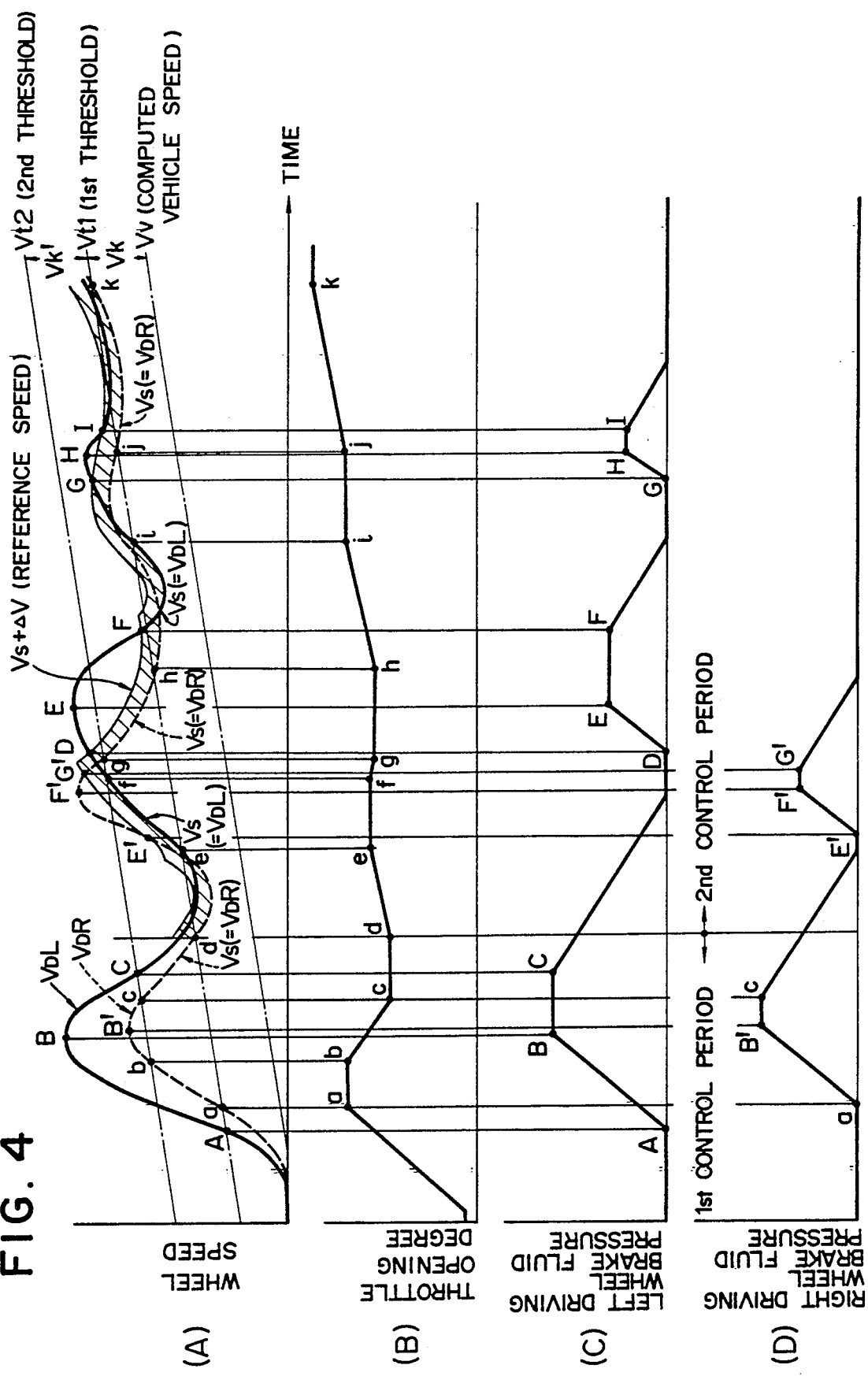
FIG. 4 shows timing charts for engine output and brake hydraulic pressure controls.

FIG. 3 shows the construction of the control circuit 23, and FIG. 4 shows a timing chart for the traction control executed by the control circuit 23. The speeds of the driving wheels 20L and 20R are detected by wheel speed sensors 24L and 24R respectively, and driving wheel speeds VDL and VDR are computed in computing circuits 31 and 32 as shown at (A) in FIG. 4. In this case, the sensor 24L and computing circuit 31 correspond to wheel speed detecting means 1L of FIG. 1, and the sensor 24R and computing circuit 32 correspond to wheel speed detecting means 1R. The wheel speeds VDL and VDR are inputted to a control logic circuit 30. The speeds of the lefthand and righthand non-driving wheels 22L and 22R are detected by wheel speed sensors 25L and 25R respectively, and lefthand and righthand non-driving wheel speeds VNL and VNR are computed in computing circuits 33 and 34 respectively.

The lefthand and righthand driving wheel speeds VDL and VDR are passed to a select-low circuit 35 which corresponds to the select-low means 2 of FIG. 1 so that the lower one of the wheel speeds VDL and VDR is selected and computed to provide a control object speed Vs which in turn is provided to the control logic circuit 30. The control object speed Vs is also provided to an adding circuit 36 which corresponds to the reference speed setting-up circuit 3 of FIG. 1 so that a predetermined value $\Delta V$ is added to the control object speed Vs, and the result of the addition is inputted to the control logic circuit 30 as a reference speed $Vs + \Delta V$ for brake fluid pressure control.

The speeds VNL and VNR of the lefthand and righthand non-driving wheels 22L and 22R are provided to a select-high circuit 37 so that the higher one of the wheel speeds VNL and VNR is selected and computed to provide a computed vehicle speed Vv which is approximate to the real vehicle speed; and the computed vehicle speed Vv is provided to an adding circuit 38 in which a first predetermined value Vk is added to the computed vehicle speed Vv to provide a first threshold value Vt1 $(=Vv+Vk)$ as shown at (A) in FIG. 4, and a second predetermined value Vk' is added to the first threshold value Vt1 to provide a second threshold value Vt2 $(=Vv+Vk+Vk')$. The first and second threshold values Vt1 and Vt2 are inputted to the control logic circuit 30. The select-high circuit 37 and adding circuit 38 correspond to the threshold value setting-up means 4 of FIG. 1. Outputs from the brake switch 26 and sensor 28 are inputted to the control logic circuit 30. In response to the various signals mentioned above, the control circuit drives a throttle control mechanism 29 to control the throttle opening degree when the motor vehicle starts or accelerates, as shown in FIG. 4(B), while at the same time controlling the opening/closing operations of hold valves HV, decay valves DV and so forth, thereby controlling the brake hydraulic pressure at wheel cylinders 21 for lefthand and righthand driving wheels 20L, 20R so that traction control is performed as shown at (C) and (D) in FIG. 4.

Figure 5:
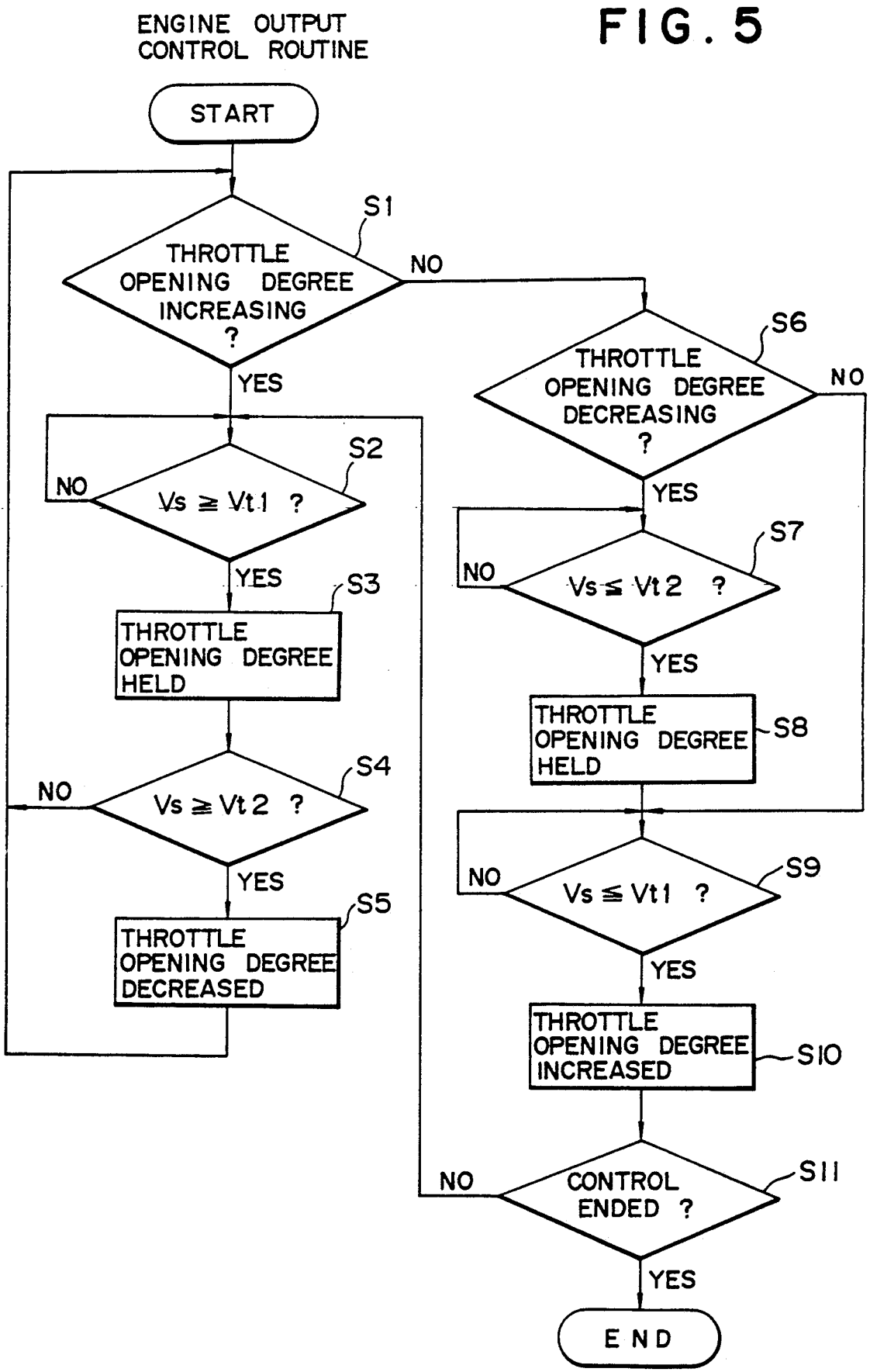
FIG. 5 shows a flow chart for engine output control routine.

FIG. 5 shows a flow chart of an engine output control routine executed by the control circuit 23, which will now be described with reference to FIG. 4(A) and (B).

The engine output control method of the present invention is characterized in that the lower one of the speeds VDL and VDR of the lefthand and righthand driving wheels 20L and 20R is selected as a control object speed Vs and is controlled by being compared with threshold values Vt1 and Vt2. First, when it is detected at step S1 that the throttle opening degree is increasing when the motor vehicle starts, and it is detected at step S2 that the control object speed Vs, which is equal to the lower wheel speed VDR in this case, has exceeded the first threshold value Vt1 at a time point a due to slipping of the driving wheels 20L, 20R, the control routine proceeds to step S3 and the throttle opening degree prevailing at the time point a is held. When it is detected at the next step S4 that the control object speed Vs has exceeded the second threshold value Vt2, the throttle opening degree is reduced at step S5 so that the engine speed is reduced and the control routine returns to the step S1. In the case where the control object speed Vs is not in excess of the second threshold value Vt2, then the control routine returns to the step S2 from the step S4.

When it is detected, as a result of the judgment made at the step S1, that the throttle opening degree is not increasing, the control routine proceeds to step S6 where judgment is made as to whether the throttle opening degree is decreasing or being held. In the case where the throttle opening degree is decreasing prevailing at a time point b then the control routine proceeds to step S7 where judgment is made as to whether or not the control object speed Vs is lower than the second threshold value Vt2. When the control object speed Vs is lower than the second threshold value Vt2, the control routine proceeds to step S8 where the throttle opening degree prevailing at a time point c is held, and the control routine further proceeds to steps S9. In the case where it is detected that the throttle opening degree is being held as a result of the judgment made at the step S6, i.e., in the case where the control object speed Vs has not reached the second threshold value Vt2, then the control routine proceeds from the step S6 directly to the step S9. At the step S9, judgment is made as to whether or not the control object speed Vs is lower than the first threshold value Vt1. When the control object speed Vs is lower than the first threshold value Vt1, then the control routine proceeds to step S10 where the throttle opening degree is increased from a time point d so that the engine output will be increased. At the next step S11, judgment is made as to whether or not the control object speed Vs is in such a state that a preset condition for completing the control is satisfied. As long as the result of this judgment is "NO", the control routine returns to the step S2 and the above-mentioned control procedure is repeated so that the throttle opening degree is controlled, through comparison of the control object speed Vs and threshold values Vt1 and Vt2 as shown at e, f, g, . . . in FIG. 4(B).

Figure 6:
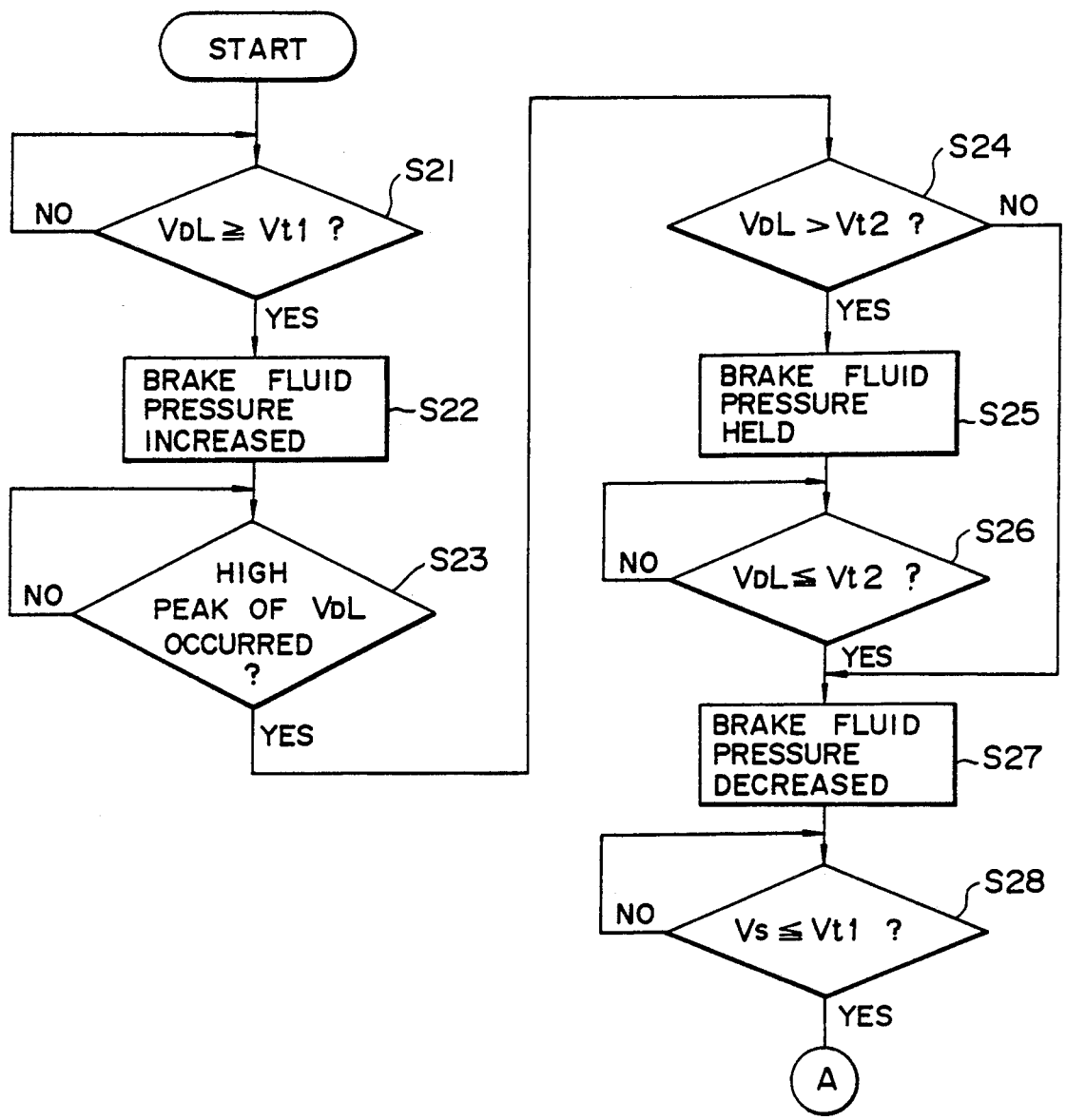
FIGS. 6 and 7 show flow charts for brake hydraulic pressure control routine.
Figure 7:
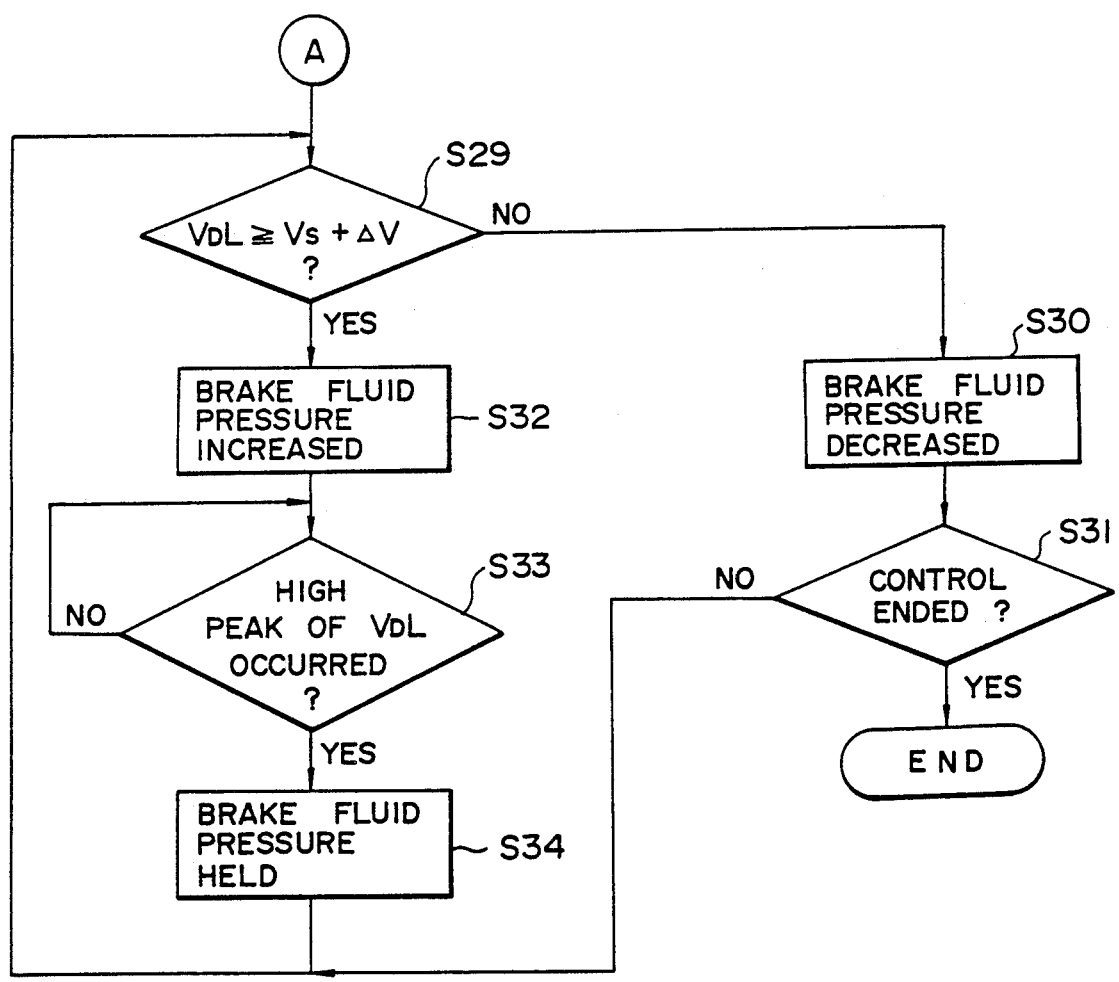

FIGS. 6 and 7 show a flow chart concerning the brake hydraulic pressure control routine executed by the control circuit 23. The brake hydraulic pressure control procedure according to the present invention is characterized in that the control mode is changed at the time point d in FIG. 4, i.e., at the time point when the control object speed Vs becomes lower than the first threshold value Vt1. In FIG. 6, steps S21 to S28 represent the processing procedure as performed during the initial or first control period; and in FIG. 7, steps S29 to S34 represents the processing procedure as performed during the subsequent or second control period which occurs after the time point d. More specifically, during the first control period, the speeds VDL and VDR of the driving wheels 20L, 20R are respectively compared with the first threshold values Vt1, Vt2 to control the brake hydraulic pressure applied to wheel cylinders 21 for the driving wheels 20L, 20R. During the second control period, the speeds VDL, VDR or the driving wheels 20L, 20R are compared with reference speed $Vs + \Delta V$ which is higher by a predetermined vaue $\Delta V$ than the control object speed Vs, instead of the threshold values Vt1, Vt2, to control the brake hydraulic pressure. Thus, the brake hydraulic pressure control is performed with respect to only the wheel speed which goes above beyond the region shown by hatching in FIG. 4(A). FIGS. 6 and 7 show the brake hydraulic pressure control with respect to the lefthand driving wheel 20L, and the brake hydraulic control with respect to the righthand driving wheel 20R is performed in the same way.

Before the traction control starts, the hold valves HV and decay valves DV are closed while the gate valve GV and cut valves CV are opened, so that the brake manipulation through brake pedal 10 is ready to be performed. First, the brake hydraulic pressure control with respect to the driving wheel 20L starts as shown in FIG. 4(C) at a time point A when it is detected, at step S21, that the wheel speed VDL has exceeded the first threshold value Vt1 as a result of slipping of the driving wheel 20L when the motor vehicle starts. Then the control routine proceeds to step S22 where the gate valves GV and cut valves CV are closed so that the brake hydraulic pressure for the driving wheel 20L is set to be controlled simply through the opening/closing operations of the hold valves HV and decay valves DV, so that the brake hydraulic pressure begins to be increased by opening only the hold valves HV. At the next step S23, judgment is made as to whether or not the wheel speed VDL has reached a high peak. At a time point B, a high peak of the wheel speed VDL is reached, and judgment is made, at steps S24, as to whether or not the high peak point is higher than the second threshold value Vt2. When the high peak becomes higher than the second threshold value Vt2, the control routine proceeds to step S25 where the hold valves HV are closed at the time point B to hold the brake hydraulic pressure. When it is detected, at the next step, that the wheel speed VDL is lower than the second threshold value Vt2 at a time point C, the control routine proceeds to step S27 where only the decay valves DV are opened so that the brake hydraulic pressure is reduced at the time point C. When the result of the judgment at the step S24 indicates that the high peak of the wheel speed VDL is not higher than the second threshold value Vt2, the control routine proceeds directly to step S27 from the step S24, and the hold valves HV are closed while the decay valves DV are opened, so that the brake hydraulic pressure is reduced. At step S28, judgement is made as to whether or not the control object speed Vs is lower than the first threshold value Vt1 at the time point d, the first control period is terminated, and the control routine is changed to the control processing mode which effected during the second control period as indicated by steps S29 and succeeding steps in FIG. 7.

At the step S29, judgment is made as to whether or not the wheel speed VDL exceeds the reference speed Vs+ΔV. While the wheel speed VDL remains below the reference speed Vs+ΔV, the control routine proceeds to step S30 where the decay valves remain open and the reduction of the brake hydraulic pressure is continued. When it is judged at step S31 that the control completing condition is not satisfied, the control routine returns to the steps S29. When the result of the judgment at the step S29 indicates that the wheel speed VDL is higher than the reference speed Vs+ΔV at a time point D, the control routine proceeds to step S32 where the decay valves DV are closed at the time point D while the hold valves HV are opened so that the brake hydraulic pressure is increased. At steps S33, judgment is made as to whether or not the wheel speed VDL reaches a high peak point. When the high peak point of the wheel speed VDL is reached at a time point E, the hold valves HV are closed to hold the brake hydraulic pressure as at step S34. Thus the control routine returns to the step S29 again, when it is judged at that step that the wheel speed VDL is lower than the reference speed Vs+ΔV at a time point F, the control routine proceeds to the step S30 where the brake hydraulic pressure is reduced at the time point F. Similarly, the brake hydraulic pressure is increased at a time point G when the wheel speed VDL becomes higher than the reference speed Vs+ΔV; the brake hydraulic pressure is held when a high peak of the wheel speed VDL is reached at a time point H; and the brake hydraulic pressure is reduced at time point I when the wheel speed VDL becomes lower than the reference speed Vs+ΔV. In this way, the processing procedure set during the second control period is repeated until the preset control completing condition is satisfied.

What has been described above relates to the brake hydraulic pressure control with respect to the lefthand driving wheel 20L, and the controlled state of the brake hydraulic pressure with respect to the righthand driving wheel 20R is shown in FIG. 4(D). As in the case of the lefthand driving wheel 20L, during the first control period, the brake hydraulic pressure begins to be increased at the time point a when the wheel speed becomes higher than the first threshold value Vt1 as shown in FIG. 4(A); at a time point B' when a high peak of the wheel speed occurs, the brake hydraulic pressure is held; and the brake hydraulic pressure is reduced at a time point C when the wheel speed VDR becomes lower than the second threshold value Vt2. During the second control period after the time point d, the brake hydraulic pressure begins to be increased at a time point E' when the wheel speed VDR exceeds the reference speed Vs+ΔV; the brake hydraulic pressure is held when a high peak point F' is reached; and the brake hydraulic pressure is reduced at a time point G' when the wheel speed VDR becomes lower than the reference speed Vs+ΔV.

As will be appreciated from the above explanation, with the traction control method and apparatus for motor vehicles according to the present invention, the brake hydraullic pressure control period is divided into two control periods, i.e., an initial or first control period and a subsequent second control period; during the initial first control period, a slip of the driving wheels 20L, 20R can be restrained by sufficiently applying a braking force to the lefthand and righthand driving wheels 20L, 20R, and at the same time the throttle opening degree is controlled so that the engine output is adjusted to a level adapted for the friction coefficient of the road surface; thereafter, during the second control period, the control procedure for the brake hydraulic pressure is changed so that a braking force corresponding to the amount by which the wheel speeds VDL, VDR exceed the reference speed Vs+ΔV, is applied to the lefthand and righthand driving wheels 20L, 20R; and in this way, the difference in speed between the lefthand and righthand driving wheels 20L, 20R is cancelled so that a hunting phenomenon which would otherwise occur can be prevented. Further, according to the present invention, the brake hydraulic pressure for the lefthand and righthand driving wheels 20L, 20R are independently controlled so that the motor vehicle is enabled to start and accelerate smoothly and safely while slipping of the driving wheels is restrained even when the motor vehicle runs on a so-called split -μ road surface, the portions of which the lefthand and righthand driving wheels are placed on, represent remarkably different friction coefficients.

While the present invention has been illustrated and described with respect to specific embodiments, it is to be understood that the present invention is by no means limited thereto but encompasses all changes and modifications which will become possible within the scope of the appended claims.

We claim:

1. A traction control method for motor vehicles, wherein a slip of a driving wheel which tends to occur when the motor vehicle starts, is detected; and an engine output and a braking force imparted to said driving wheel are controlled on the basis of said detection, thereby restraining the slip of said driving wheel, said traction control method comprising the steps of:

selecting a lower speed of lefthand and righthand driving wheel speeds as a control object speed, and comparing said control object speed with a threshold value preset in relation to vehicle speed to control the engine output thereby; and dividing a brake control period for driving wheels into an initial first control period and a subsequent second control period, wherein during said first control period, a brake control for the respective driving wheels is provided by comparing the respective driving wheel speeds with said threshold value; and during said second control period, said brake control is performed by comparing the respective driving wheel speeds with a reference speed greater by a predetermined value than said control object speed.

2. A traction control method according to claim 1, wherein a higher speed of lefthand and righthand non-driving wheel speeds is selected as a computed vehicle speed; and a speed greater by a predetermined value than the computed vehicle speed is set as said threshold value.

3. A traction control method according to claim 2, wherein said threshold value is set up as a first threshold value, and a speed greater by a predetermined value than said first threshold value is set up as a second threshold value.

4. A traction control method according to claim 3, wherein said second control period starts at a time point when said control object speed is less than said first threshold value.

5. A traction control method for motor vehicles, wherein a slip of a driving wheel which tends to occur when the motor vehicle accelerates, is detected; and an engine output and a braking force imparted to said driving wheel are controlled on the basis of said detection, thereby restraining the slip of said driving wheel, said traction control method comprising the steps of:

selecting a lower speed of lefthand and righthand driving wheel speeds as a control object speed, and comparing said control object speed with a threshold value preset in relation to vehicle speed to control the engine output thereby; and dividing a brake control period for driving wheels into an initial first control period and a subsequent second control period, wherein during said first control period, a brake control for the respective driving wheels is provided by comparing the respective driving wheel speeds with said threshold value; and during said second control period, said brake control is performed by comparing the respective driving wheel speeds with a reference speed greater by a predetermined value than said control object speed.

6. A traction control method according to claim 5, wherein a higher speed of lefthand and righthand non-driving wheel speeds is selected as a computed vehicle speed; and a speed greater by a predetermined value than the computed vehicle speed is set as said threshold value.

7. A traction control method according to claim 6, wherein said threshold value is set up as a first threshold value, and a speed greater by a predetermined value than said first threshold value is set up as a second threshold value.

8. A traction control method according to claim 7, wherein said second control period starts at a time point when said control object speed is less than said first threshold value.

* * * * *